Nov. 5, 1963

E. G. HANSEN 3,109,486

HEATING AND COOLING SYSTEM

Filed July 11, 1960

INVENTOR
ERWIN G. HANSEN
BY
Kenyon & Kenyon
ATTORNEYS

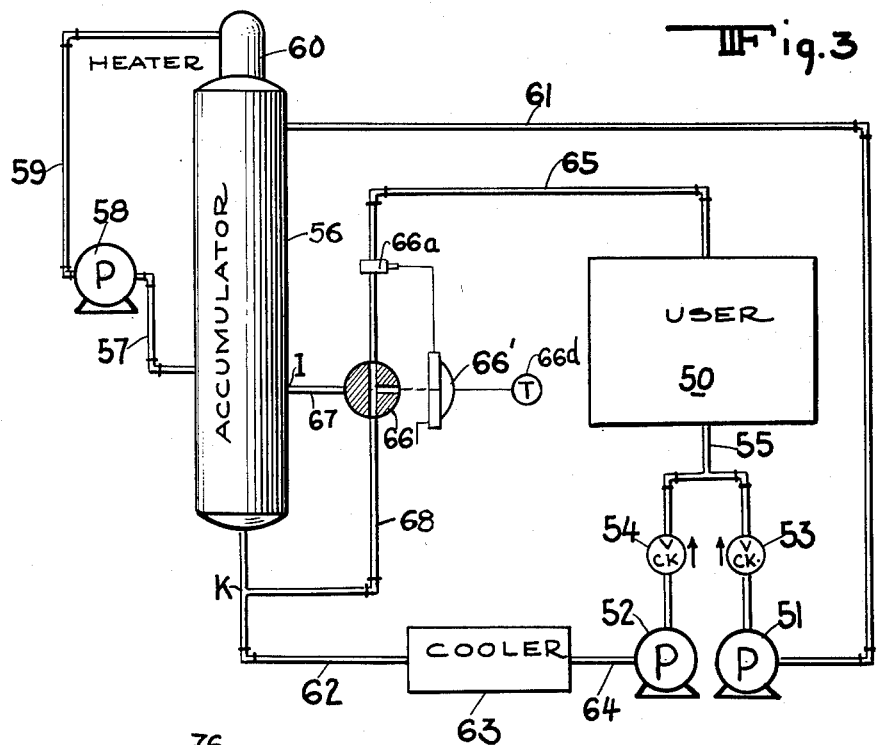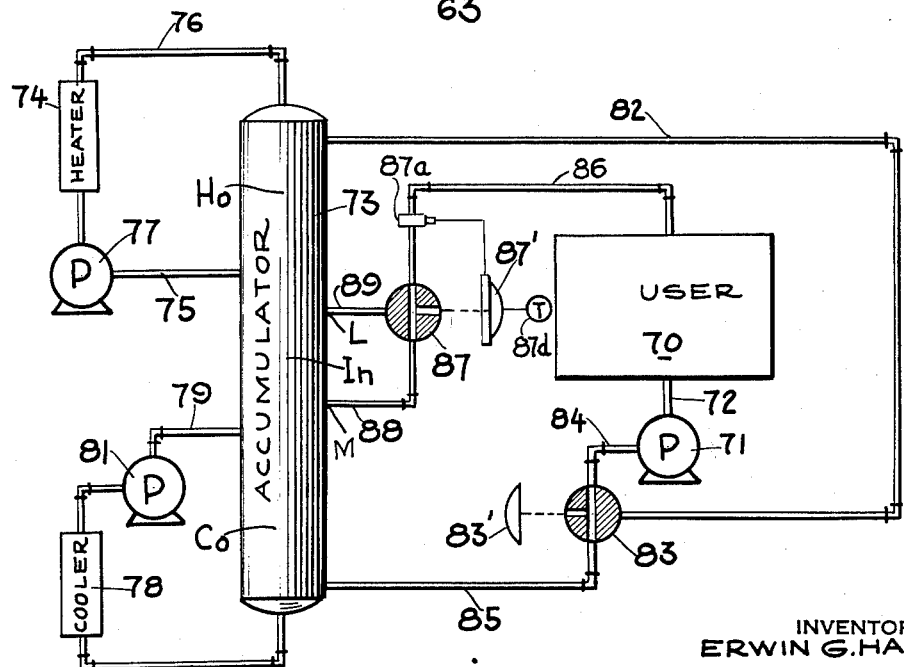

United States Patent Office 3,109,486
Patented Nov. 5, 1963

3,109,486
HEATING AND COOLING SYSTEM
Erwin G. Hansen, New York, N.Y., assignor to Midland-Ross Corporation, New York, N.Y., a corporation of Ohio
Filed July 11, 1960, Ser. No. 41,919
20 Claims. (Cl. 165—1)

This invention relates to closed, combined heating and cooling systems for industrial processes, and more particularly to improvements for increasing the efficiency in such systems in which heating and cooling phases alternate to form a complete cycle.

In closed heating and cooling systems employing a liquid heat transfer agent, for example, for presses and for other user equipment, which have to be heated up and then cooled down, and in which the heat transfer agent is common for heating and cooling, there is often a problem in that, at the end of either the heating or cooling phase, the heating and cooling conduits inside of the equipment and the piping common to the heating and cooling circuits are full of the liquid either at high or low temperature, as the case may be, depending upon whether the completed phase has been one of heating or of cooling. When the particular phase is then succeeded by the next phase, this residual quantity of the heated or cooled liquid must either be cooled or heated, as the case may be, in addition to the cooling or the heating of the user equipment. This additional heating and cooling requirement may be considerable and may impose a severe strain on the heater and cooler, and may even make it impossible to attain the desired change in cooling or heating effect within a specified time.

Furthermore, most and sometimes all, of the heat that is rejected during the cooling phase was added to the system during the preceding heating phase. The operation is then one of succeeding cycles in which heat is introduced in one phase, only to be rejected in the next. In some of the heat that is withdrawn from the user during the cooling phase, instead of being rejected, can be stored and reused in the next heating phase, then the efficiency of this basically wasteful operation can be improved.

Objects and features of the present invention are the provision of a system for diverting the aforesaid residual heated or cooled quantity of liquid remaining from the concluding phase, when a change of phase occurs, and any liquid from the present phase, heated or cooled, as the case may be, beyond a certain temperature in contact with the previously heated or cooled user, to a storage vessel or accumulator.

In entering this accumulator the liquid displaces an equal volume of the liquid stored in said accumulator during the previous phase into the circulating system, while the entering liquid remains in the accumulator at rest for use in the next phase. In this way, unnecessary strain on the heater and cooler is avoided, and the overall efficiency of the system greatly improved.

Further objects and features of the invention are the provision of simple arrangements for effecting the foregoing either in new systems or in systems presently extant.

During normal operation of a particular phase either cooling or heating, the spent liquid leaving the user equipment is returned to the zone of its derivation. For example, during heating phase the zone of derivation of the liquid is that associated with the heating means for the liquid while during cooling phase, the zone of derivation of the liquid is that associated with the cooling means for the liquid. The spent liquids in either phase are returned to their respective zones of derivation in the region of the latter most nearly approximating the temperatures of the spent liquids. However, at the occurrence of a change-over from one phase to another, without the practice of this invention, the residual spent liquid of the terminating phase would then be returned to the zone of derivation of the new phase at a temperature disproportionately different from that in said new phase derivation zone, with consequent loss of efficiency. This, however, is avoided in the instant invention by providing a time lag of operation in the return flow circuit as regards phase change-over in the user feed circuit. This time lag is sufficiently long to permit discharge of residual spent fluid from the user equipment at the time of change-over, into an accumulator from where it will return to its original source after the next phase change has occurred. Also, newly spent liquid in the initial stage or period of the new phase returning at a temperature disproportionately different from that in said new phase derivative zone may thus be stored in the accumulator for return to a derivative source more nearly approximately its temperature. Thereafter, operation of the return flow circuit is effected to divert further spent liquid in the new phase from the user equipment to its derivative source in the new phase. In consequence, spent liquid from the user equipment in any phase is returned to the derivative source most closely approximating its temperature at all times.

Further objects and features of this invention are the provision of valving means and circuit connections for effecting the foregoing time lag at change-over between flow in the user return flow circuit and in the user feed circuit so as to insure delivery of residual spent liquid from the user plus newly spent liquid in the initial stages of the new phase to a derivative source most closely approximating its temperature.

Additional objects and features of this invention are the provision of a novel method of operating heating and cooling systems with great efficiency.

Other objects and features of the invention will become apparent from the following specification and the accompanying drawings forming a part hereof, wherein FIGURE 1 is a diagrammatic showing of a heating and cooling system arranged in accordance with this invention;

FIGURE 3 is a similar showing of a further embodiment; and

FIGURE 4 is a similar showing of a further embodiment.

Figure 1:
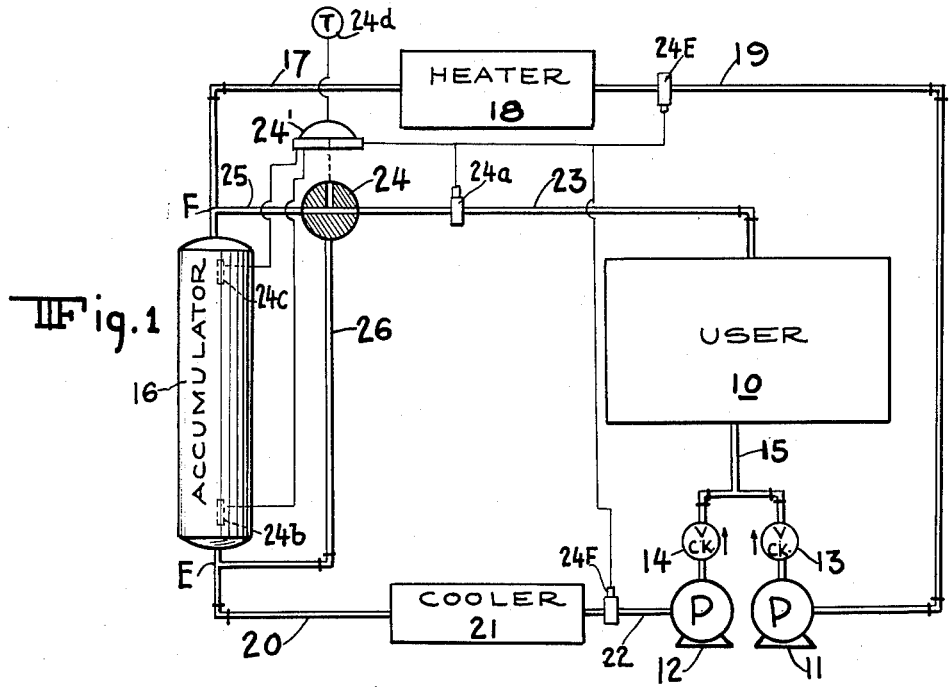

Referring to the drawings and first to FIGURE 1, the refreence character 10 denotes user equipment such as a press or the like which alternately it is desired to heat or cool in successive phases utilizing the same liquid heat transfer agent.

A pair of alternately operable heat and coolant supplying pumps 11 and 12 have their delivery outlets connected through check valves 13 and 14 and via a common pipe line or conduit 15 to the inlet to the user. An accumulator tank 16 is provided. The upper part of this tank is connected by piping 17 to a conventional heater 18 which in turn is connected by piping 19 to the heating liquid supplying pump 11. The lower part of accumulator tank 16 is connected by piping 20 to a conventional cooler 21 and this latter is connected by piping 22 to the cooling liquid supplying pump 12.

The user equipment outlet is connected by return piping 23 to an inlet of a three way valve 24 and from an outlet of the latter via branch piping 25 to junction F with piping 17. The three way valve 24 has its other outlet connected via branch piping 26 to junction E with piping 20. The position of the control member 24' of the three way valve is adjustable either to permit direct flow of liquid from piping 23 to piping 25, or cut off the latter and to direct flow of liquid from piping 23 to piping 26. Member 24' may be operated either manually, or by a timer, or by an appropriate thermostatic device or by other automatic means.

Assuming that pump 11 is operating in the heating phase, hot liquid flows from the heater 18 via piping 19 to pump 11. This hot liquid is pumped via piping 15 through the user 10. Spent liquid from the latter flows via piping 23 to the inlet of three way valve 24 and via an outlet of said valve and piping 25 to the junction F with piping 17 and from there via piping 17 to heater 18.

Upon completion of the desired heating phase in user 10, the heating pump 11 is cut off and the coolant pump 12 is started. At this time the user 10 and common piping 15, as well as piping 23 are full of residual hot liquid of the terminated phase which in a conventional system would now be passed through the cooler 21 via piping 20. To obviate this undesired hot liquid circulation to the cooler 21, the valve control or operating member 24' of the three way valve 24 is then not shifted so that the flow of the spent liquid continues via piping 25 to junction F with piping 17, and from there is delivered to the upper part of tank 16 via piping 17. The hot liquid entering tank 16 at its upper part displaces an equal volume of cold liquid from the lower part of tank 16 which flows via piping 20 to cooler 21.

The latter thus receives cold heat transfer liquid which after further cooling is circulated via piping 22, pump 12 and piping 15 to the user eliminating the necessity of cooling down residual hot liquid in the user and common piping at change-over which previous to this invention would ordinarily be pumped to cooler 21.

This adjusted position of the valve operating member 24' is maintained until all the hot residual liquid in the piping 15, the user 10, and piping 23 plus spent liquid in the initial stages of the new phase, that has been newly heated in cooling down the hot user, has been delivered to the upper part of tank 16. Then, after this time lag, either manually or through automatic operations by thermostat or by timer, the valve operating member 24' is shifted to close off piping 25 and open communication between piping 23 and 26 so that further spent coolant in the new phase leaving the user 10 is recycled directly via piping 23, valve 24, piping 26 and piping 20 to the cooler 21, and via piping 22, pump 12, and piping 15, to user 10 for the duration of the cooling phase in user 10. The hotter charge delivered to the upper part of the accumulator 16 prior to said shift of valve operating member 24' meanwhile remains at rest awaiting the next phase reversal.

When time for the next heating phase occurs, the cooling pump 12 is stopped and heating pump 11 is motivated. No immediate change in the position of the control member 24' of the three way valve is then effected. Residual cool liquid in piping 15, the user 10 and piping 23 is expelled therefrom and via piping 26, junction E with piping 20 and piping 20 enters the lower part of the accumulator 16. It displaces the hot charge in the accumulator upward and out through piping 17 to heater 18, from where the heating liquid flows through piping 19, pump 11, and piping 15 to user 10.

As soon as all residual cool liquid in piping 15, user 10 and piping 23 of the completed cooling phase plus liquid in the initial stages of the new phase, newly cooled in transferring heat to the cold user, has been delivered to tank 16, either automatically, or else by a manual operation, the three way valve operator 24' is shifted to close off piping 26 and open piping 25, so that further discharge of further spent liquid of the new heating phase leaving user 10 by piping 23, and which is hotter than the cool liquid stored in the lower part of the accumulator 16, is now circulated directly to the heater 18 via piping 25 and 17, for the remainder of the heating phase. The cooler charge stored in the accumulator 16 during the initial part of the new heating phase now remains at rest awaiting the next phase reversal.

The provision thus, of accumulator tank 16 in conjunction with the three way valve 24, with its piping or conduit connections as described and either manual or automatic operation of its port control member 24' in the sequence described, permits efficient operation of the system and eliminates unnecessary heat-up or cool-down of the residual heat transfer liquid in successive change-over from one phase to another. It provides return of residual spent liquid at time of change-over to the region of its derivative source in the terminating phase, plus the delivery of newly spent fluid during the initial stages of the new phase to the derivative source most closely proximating the temperature of said spent liquid.

The check valves 13 and 14 open for the passage of liquid through them toward the user from the respective pumps 11 and 12 but close to flow in reverse direction. The purpose of these valves is to prevent reversal of flow through the stopped one of the pumps, caused by the head pressure of the other pump which is operating.

Several possibilities for operating the member 24' at the appropriate moment to accomplish the ends of the invention are shown in FIGURE 1. Thermostatic means 24a may be situated in piping 23 where the temperature of the returning spent liquid may be measured. By means well known in the thermo-switching arts, actuating member 24' may be set to change the position of valve 24 when the temperature of the returning spent liquid as measured by thermostat means 24a has fallen or risen a predetermined number of degrees.

Thus in changing over from a heating to a cooling phase, the thermostat means 24a would not actuate means 24' to switch valve 24 from delivery to point F to delivery to point E until a predetermined temperature drop had occurred, rendering the returning liquid more compatible with the second destination than the first. So also in going from a cooling phase to a heating phase the thermostat means 24a would not cause control member 24' to switch valve 24 to a position delivering spent liquid to point F from the position delivering it to point E until a predetermined temperature rise had been sensed by thermostat means 24a, indicating the returning liquid was more temperature compatible with delivery to the point F than to point E.

Still another way of controlling valve 24 is by thermostat means 24b and 24c which are means for determining the temperatures at their respective ends of the accumulator 16. Control means 24' may be set to respond to the temperature condition sensed by either thermostat 24b or 24c. Thus in change-over from a heating to a cooling phase, valve 24 would remain in a position delivering spent liquid to point F and thence to the end of accumulator 16 until thermostat 24b senses arrival at a predetermined temperature, upon which event control means 24' would actuate valve 24 and divert returning spent liquid to a destination at point E. So also in change-over from a cooling to a heating phase, valve 24 would not switch returning spent liquid from point E to point F until thermostat 24c senses arrival at a predetermined temperature.

Still another way of controlling valve 24 is by thermostat means 24e and 24f in conjunction with 24a. Thermostats 24e and 24f are adapted to measure the temperature of liquid emanating from the heater and cooler respectively. Control means 24' may be adapted to respond to the temperature difference measured between thermostats 24a and 24e, and between 24a and 24f. So in going from a heating to a cooling phase, control means 24' would allow valve 24 to remain in a position returning spent liquid to point F and thence to the accumulator until the temperature difference measured by thermostats 24a and 24f is less than the temperature difference measured by thermostats 24a and 24e, upon which event control means 24' would switch valve 24 so as to divert further returning spent liquid to point E. Similarly in going from a cooling to a heating phase, control means 24' would switch valve 24 from delivery to point E to delivery to point F when the temperature difference sensed between thermostats 24a and 24e is less than the temperature difference sensed between thermostats 24a and 24f.

Still another method for controlling valve 24 is by timer means such as 24d. All the equipment in the system has known fluid capacity, so a known period of time passes at a given pump speed before all terminating phase liquid is cleared out and before enough succeeding phase liquid has passed through the system to nullify the temperature effect on the metallic equipment from the last phase. This known time can be set into a standard timer means, and the clock means may be actuated by the beginning of the phase change-over, and a predetermined period later the timer means will cause control means 24' to switch valve 24 so as to divert returning spent liquid from an old to a new destination. Temperature compatibility of the returning liquid with the destinations during change-over is thus controlled by elapse of time, which is directly correlated to the temperature changes.

It must be understood that other means for switching valve 24 at the appropriate moment will be apparent to those skilled in the art. Also the embodiments of FIGURES 2 through 4 operate in a like manner as FIGURE 1, the only difference being the points of placement of thermostats within the accumulator 16, such placement being in all cases at the points of return of spent liquid.

The principles of this invention are not limited to the use of three way valves. If desired, the three way valve 24 may be replaced by separate control valves (not shown) in respective pipings 25 and 26 so that one or the other of these pipings may be selectively in communication with piping 23. Conceivably, the three way valve 24 may also be replaced by separate or multiport control valves at junction points E and F in order to achieve the same results. Also, pipings 25 and 17 may be separately joined to the upper part of the tank 16 and pipings 26 and 20 may be separately joined to the lower part of said tank, thereby eliminating the pipe junctions E and F.

The principles of this invention, moreover, are not confined to a heating and cooling installation employing two pumps. Similar results can be secured utilizing only one circulating pump in conjunction with a three way valve or similar means to circulate either heating or cooling agent through the user. Such an alternate is illustrate in FIGURE 2.

The principles of this invention may also be employed on systems supplying to more than one user and they may also be combined with heating and/or cooling accumulators on systems comporting such accumulators. Typical examples of such combinations are shown in FIGURES 2 to 4.

Figure 2:
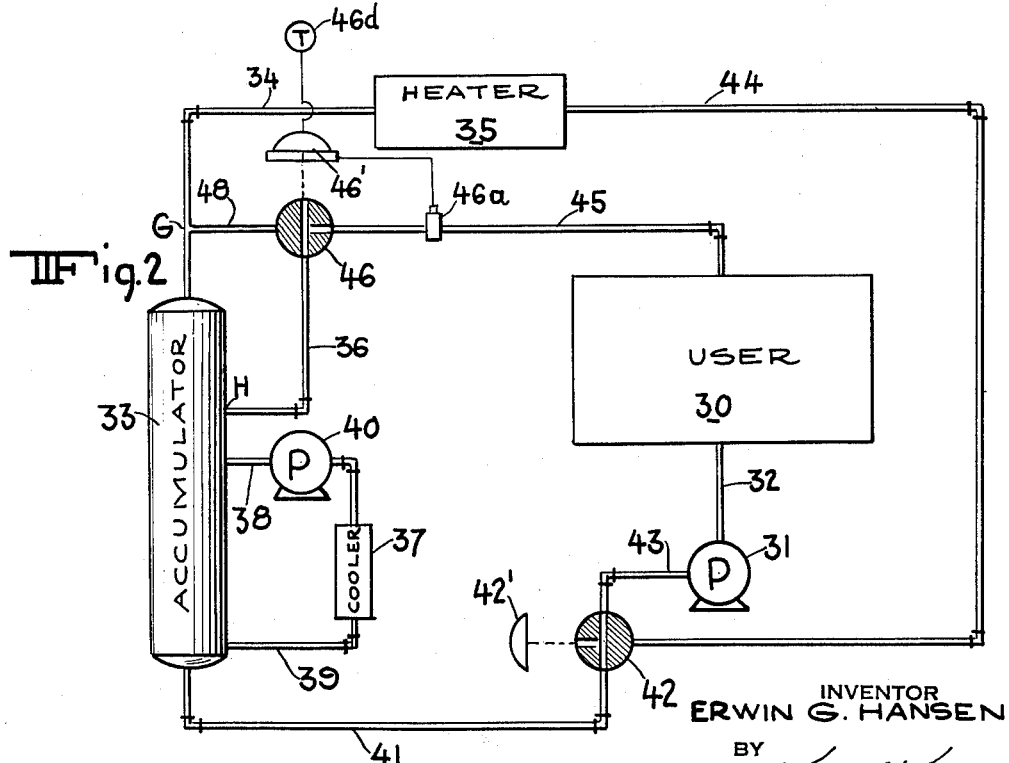
FIGURE 2 is a similar showing of another embodiment.

FIGURE 2 illustrates an embodiment of this invention in combination with a cooling accumulator. Therein the reference character 30 denotes user equipment like 10 which it is desired alternately to heat or cool in successive phases utilizing the same liquid heat transfer agent. A single pump 31 has its delivery outlet connected via a pipe line or conduit 32 to the inlet of the user 30. An accumulator tank 33 is provided. Its upper part is connected via piping 34 to a conventional heater 35. The upper part of said tank 33 above level H which is the junction with piping 36 constitutes the reversal storage section corresponding in its function to tank 16 in FIGURE 1, whereas the lower part of said tank 33 serves as cooling accumulator section. A conventional cooler 37 is connected by an appropriate piping circuit 38 and 39 and charging pump 40 to said lower part or region and functions by taking liquid out of the median portion of the tank and delivering it after cooling to the lower portion. The lower part of the tank 33 is the derivative source for liquid in the cooling phase. Its outlet is connected by piping 41 to an inlet of a three way valve 42, the outlet of said valve being connected by piping 43 to pump 31. Delivery piping 44 from heater 35 is connected to another inlet of the three way valve 42. The position of the valve control member 42' determines whether piping 42 connects the pump to hot liquid line 44 or cold liquid line 41. The operation of member 42' may be either manual or automatic. If desired the three way valve 42 may be replaced by separate control valves (not shown) in respective pipings 44 and 41 so that one or the other of these pipings may be selectively connected to piping 43 and pump 31.

The outlet of user 30 is connected by piping 45 to the inlet of a three way valve 46 whose function is similar to that of a three way valve 24. One outlet of the three way valve 46 is connected by branch piping 36 to the accumulator tank 33 at level H. The other outlet of the three way valve 46 is connected via branch piping 48 to junction G with piping 34. If desired, the three way valve 46 may be replaced by separate control valves (not shown) in respective branch pipings 36 and 48, so that one or the other of these pipings may be selectively connected to piping 45.

When the three way valve 42 is in the cooling position, that is, when it connects piping 41 to piping 43, the pump 31 is operating in the cooling phase drawing cool liquid via piping 41 from its derivative source in the lower part of tank 33 and circulates it through user 30 and returns spent liquid from user 30 via piping 45, three way valve 46 and branch piping 36 to level H of tank 33, the region most closely proximating the spent liquid temperature, whence it is recooled via piping 38, pump 40, cooler 37, and piping 39, before being recycled from the lower part of accumulator tank 33 via piping 41.

When the time for change-over from cooling phase to heating phase occurs, the control member 42' of three way valve 42 is operated either manually or by an automatic control device to a position closing off piping 41 and opening piping 44 to the conduit 43 and pump 31. At this time operating condition of three way valve 46 remains unchanged. The hot liquid now being drawn from heater 35 via piping 44 by the pump 31 displaces residual cool liquid derived from the terminated cooling phase and still in conduit 43, pump 31, piping 32, user 30, and piping 45 plus newly spent fluid during the initial stages of the new phase, into tank 33 at level H which is the coolest level of the reversal storage section, thereby forcing warmer liquid above the level H upward and out via piping 34 to heater 35.

After a time lag when the temperature of the returning spent liquid has increased, the three way valve 46 has its operating member 46' manipulated either manually or automatically in one of the ways described for member 24' of FIGURE 1, to close off branch piping 36 and open branch piping 48 so that further circulation of heating liquid in the heating phase recycles spent warmer liquid from the user equipment directly to the heater 35 via piping 48 and piping 34.

When the next cooling phase is to occur, three way valve 42 has its control member 42' operated manually or automatically to cut off piping 44 to the pump and open piping 41 thereto. The operating position of the three way valve 46 is not changed, however, until residual warm liquid in piping 43, pump 31, piping 32, user 30 and piping 45 plus newly spent liquid from the initial stages of the new cooling phase heated in the process of cooling down the user 30, has been returned via branch piping 48 and piping 34, to the upper part of the reversal storage section of accumulator tank 33, thereby causing an equal quantity of the stored cooler water to flow downward inside the tank into the cooling accumulator section. Thereafter, upon completion of the time lag, valve operating member 46' is operated manually or automatically, closing off branch piping 48 and opening branch piping 36 to return further cooler spent liquid of the cooling phase to the tank at the level H, close to the cooling circuit in the derivative source for the cooling phase.

Thermostat 46a may be employed to control the switching of valve 46 in the same manner as previously described in FIGURE 1, where the corresponding element was thermostat 24a. Also, timer 46d may alternatively be employed in the same manner as was described for timer 24d in FIGURE 1. Thermostats (not shown) corresponding to thermostats 24b and 24c may alternatively be inserted in the accumulator at the return zones of accumulator 33 and may be adapted to operate valve 46 in the manner described for FIGURE 1. Also, control means 46' may be actuated by comparison of the temperature at 46a with the temperature at a point in the hot source of supply and a point in the cold source of supply corresponding to the means described as 24e and 24f in FIGURE 1.

FIGURE 3 illustrates an embodiment of this invention in combination with a heating accumulator. Therein the reference character 50 denotes user equipment like equipment 10 in FIGURE 1, which it is desired alternately to heat and cool in successive phases utilizing the same liquid heat transfer agent. A pair of alternatively operable heating and cooling pumps 51 and 52 have their delivery outlets connected via check valves 53 and 54 and piping 55 to user 50. An accumulator tank 56 is provided, the upper portion of which serves as a heat accumulator. A conventional accumulator recharge circuit constituted by piping 57, pump 58 and piping 59 transfers spent liquid from the lower level of the heat accumulator via conventional heater 60 to the upper part of the tank which is the derivative source for the heating phase, and which is connected by piping 61 to heating pump 51. The lower part of tank 56 below level I, constitutes the reversal storage section corresponding to tank 16 in FIGURE 1. It is connected by piping 62 to a conventional cooler 63 which in turn is connected by piping 64 to cooling pump 52.

The user equipment outlet is connected by piping 65 to the inlet of the three way valve 66. One outlet of this valve 66, which is controlled by valve operating member 66' operable manually or automatically as described for valve operating member 24' of FIGURE 1, is connected by branch piping 67 to inlet I of tank 56 which constitutes the cool level of the heating accumulator section, and at the same time the upper or warm level of the reversal storage section of the said tank 56. The other outlet of valve 66 is connected by branch piping 68 to junction K with piping 62.

In the latter stages of the cooling phase in user 50, three way valve 66 makes communication between pipings 65 and 68. Coolant is then supplied from cooler 63 via piping 64, pump 52 and piping 55 to user 50 and spent coolant from user 50 returns via piping 65, three way valve 66, branch piping 68 and piping 62 directly into the cooler 63.

When the time for change-over to the heating phase occurs, cooling pump 52 is stopped and heating pump 51 is started. The latter then draws heated liquid from the hot derivative source in upper portion of the heating accumulator 56 via piping 61, and pumps this liquid via piping 55 to user 50. Valve 66 remains unchanged from its final cooling phase position for the time being. The residual cool liquid in piping 55, user 50 and piping 65 from the terminating cooling phase and any newly spent liquid during the initial stage of the new heating phase then enters via branch piping 68 and piping 62 the lower part of accumulator tank 56 and displaces an equal volume of warmer liquid stored during the previous phase, upwards from the reveral storage section past level I in the lower part of the accumulator section so that it can be drawn by pump 58, via piping 57 and discharged by piping 59 through heater 60 to the upper part of the accumulator tank 56.

Upon conclusion of the required time lag, the valve operating member 66' of the three way valve 66 is shifted manually or automatically in the same way as described for valve control member 24' of FIGURE 1 to close off branch piping 68 and to open branch piping 67 so that subsequent flow of spent warmer liquid is now diverted via branch piping 67 for entrance directly into the heating accumulator section at the cooler level I, i.e., for return to the derivative source of the phase now in operation at the region most closely approximating the temperature of the now warmer spent liquid leaving user 50.

When the next cooling phase is initiated, the heating pump 51 is stopped and cooling pump 52 is started so that cooling fluid is drawn via piping 64 from cooler 63 for circulation to user 50. Valve 66 remains unchanged from its final heating phase position for the time being. Residual hot liquid in piping 55, user 50 and piping 65, plus newly spent liquid from the initial stage of the new cooling phase enters accumulator 56 at level I, i.e., at a level closest in temperature to the temperature of the returning fluid thereby forcing an equal volume of cooler liquid out of the lower part of the reversal storage section via piping 62 to cooler 63. After a time lag, when the temperature of the returning spent liquid is cooler, the operating member 66' of the three way valve 66 is shifted automatically or manually as previously described so that branch piping 67 is cut off and branch piping 68 is opened. The cooler spent liquid leaving the user 50 is now diverted via branch piping 68 and piping 62 to cooler 63.

Thermostat 66a may be employed to control the switching of valve 66 in the same manner as previously described for FIGURE 1, where the corresponding element was thermostat 24a. Also, timer 66d may alternatively be employed in the same manner as was described for timer 24d in FIGURE 1. The various other means for changing the position of valve 66 as described in connection with FIGURES 1 and 2 may also be employed here.

The principles of this invention are also applicable to systems using a heating and a cooling accumulator contained in a single tank. In such systems the reversal storage section is also incorporated into the said tank occupying a zone located between the two accumulator sections.

A system embodying such a variant of the invention is shown in FIGURE 4. Therein the reference character 70 denotes user equipment like equipment 10 in FIGURE 1, which it is desired alternately to heat or cool in successive phases, utilizing the same liquid heat transfer agent. A single pump 71 has its delivery outlet connected via a pipe line or conduit 72 to the inlet of user 70. An accumulator tank 73 is provided. A conventional heater 74 is connected by an appropriate piping circuit 75 and 76, activated by pump 77, to supply heated liquid to the upper region Ho of the accumulator tank 73. This region Ho is the derivative source for liquid in the heating phase. A conventional cooler 78 is connected by an appropriate piping circuit 79 and 80, activated by pump 81, to supply cool liquid in the lower region Co of tank 73. Region Co is the derivative source for liquid in the cooling phase. The intermediate portion or zone In of the tank 73 lying between its heated portion Ho and cooled portion Co constitutes a reversal storage section with cooler liquid at lower levels and warmer liquid at higher levels.

Piping 82 from the hot portion Ho of tank 73 is connected to an inlet of a three way valve 83, the outlet of said valve being connected by piping 84 to pump 71. Piping 85 from cool portion Co of tank 73 is connected to another inlet of the three way valve 83. The position of the valve control member 83' determines whether piping 84 connects the pump 71 to hot liquid line 82 or cold liquid line 85. The operation of member 83' may be manual or automatically controlled. If desired, the three way valve 83 may be replaced by separate control valves (not shown) in respective pipings 82 and 85 so that one or the other of these pipings may be selectively connected to piping 84 and pump 71.

The outlet of user 70 is connected by piping 86 to an inlet of a three way valve 87 whose function is similar to that of three way valve 24 in FIGURE 1. One outlet of the three way valve 87 is connected by branch piping 88 to the accumulator tank 73 at level M. This level M is at the uppermost or warmest region of the cooling zone Co. A second outlet of the valve 87 is connected by branch piping 89 to the accumulator tank 73 at a higher level L. This level L is at the lowest or coolest region of the heating zone Ho. Both levels M and L constitute at the same time, the lower and upper boundaries of the intermediate or reversal storage zone In of tank 73, the liquid at level L being warmer than at level M.

With the positions of the valves 83 and 87 being such as to establish communication between pipings 85 and 84 and between piping 86 and branch piping 88, the user is in the cooling phase. Pump 71 draws cool liquid via piping 85 from the derivative source in the lower regions of the cool zone Co of the tank 73 and circulates it through user 70 and returns spent liquid from user 70 via piping 86, valve 87 and branch piping 88 to level M of the tank 73 in the region most closely proximating the spent liquid temperature whence it is recooled via piping 79, pump 81, cooler 78, and piping 80 before being recycled from the lower part of the cool region Co via piping 85.

When the time for change-over from cooling phase to heating phase occurs, the control member 83' of the three way valve 83 is operated either manually or by an automatic control device to a position closing off piping 85 and opening piping 82 to the conduit 84 and pump 71. At this time three way valve 87 remains unchanged from its terminal cooling phase position. The hot liquid now being drawn from the hot derivative source Ho via piping 82 by the pump 71, displaces residual cool liquid derived from the terminated cooling phase and still in piping 84, pump 71, piping 72, user 70, and piping 86 and newly spent liquid from the starting or initial period of the new phase cooled in transmitting heat to the user into tank 73 at level M which is the coolest level of the reversal storage zone In, forcing warmer liquid above the level M upwardly for heating in the circuit of heater 74 and then via piping 82 to the pump 71. After a time lag and when all the cooler spent liquid has been returned from the system into tank 73 at level M, the three way valve 87 has its operating member 87' manipulated either manually or automatically in one of the ways described for member 24' of FIGURE 1, to close off branch piping 88 and open branch piping 89 to piping 86 so that further circulation of heating liquid in the heating phase recycles spent warmer liquid from the user equipment to the accumulator tank 73 at the warmer level L rather than at the cooler level M in the reversal storage zone. This time lag in shift of return delivery of spent liquid leaving the user 70 from the respective levels M to L reduces load on the heater and cooling systems for the accumulator because it returns the spent liquid to that portion of the reversal storage region closest in temperature to that of said liquid.

When the next cooling phase is to occur, three way valve 83 has its control member 83' operated manually or automatically to cut off piping 82 to the pump and open piping 85 thereto. The position of the three way valve 87 from the terminal stage of the heating phase is not changed, however, until residual warm liquid in piping 84, pump 71, piping 72, user 70 and piping 86 from the terminated phase plus newly spent liquid in the initial stage of the newly starting phase has been delivered to the tank 73 at the warmer level L. Thereafter, upon completion of the time lag, valve operating member 87' is operated manually or automatically to close off branch piping 89 and open branch piping 88 to piping 86 to return cooler spent liquid of the cooling phase in operation to the tank 73 at the level M, closest to the cooling circuit in the derivative source in the cool portion Co of the tank.

Thermostat 87a may be employed to control the switching of valve 87 in the same manner as previously described for FIGURE 1, where the corresponding element was thermostat 24a. Also, timer 87d may alternatively be employed in the same manner as was described for timer 24d in FIGURE 1. The various other means for changing the position of valve 87 as were described in connection with FIGURES 1 and 2 may be employed here.

In this system, as with the others, spent liquid from the user is always delivered to regions of the accumulator derivative source most closely approximating in temperature that of said spent liquid.

The principles of this invention are not confined to closed, combined heating and cooling systems comporting one user, but may be used on any closed system employing a common liquid as the heat transfer agent in which one or more users are to be successively heated and cooled. "User" or "user equipment" as used in this specification, means one or more users.

Although specific embodiments of the invention have been described, variations within the scope of the appended claims are possible and are contemplated. There is no intention, therefore, of limitation to the exact details shown and described.

What is claimed is:

1. In the process of supplying user equipment with heating and cooling liquids derived respectively from heating and cooling sources associated with respective superposed heating and cooling storage zones in an accumulator with the heating storage zone uppermost via interconnecting piping with the user equipment in a first phase and a succeeding phase and in which spent liquid from the user equipment ordinarily is circulated via return conduits during operation of the first phase directly to the source thereof, the steps of switching supply of liquid to the user equipment from the source of the first phase to the source of the succeeding phase and at that time effecting the return of spent liquid from the user equipment to the storage zone in the accumulator associated with the first phase thereby displacing liquid within the accumulator downwardly when the change in phase is from heating to cooling and upwardly when the change in phase is from cooling to heating and consequently displacing an equal volume of liquid from the storage zone in the accumulator associated with the succeeding phase to the source of said succeeding phase, and subsequently switching the routing in the return conduits so as to return the spent liquid from the user equipment directly to the source of said succeeding phase while continuing to supply the user equipment from said source of said succeeding phase.

2. In the process of supplying user equipment with heating and cooling liquids derived respectively from heating and cooling sources associated with respective superposed heating and cooling storage zones in an accumulator with the heating storage zone uppermost via interconnecting piping with the user equipment in a heating phase and in a cooling phase and in which spent liquid from the user equipment ordinarily is circulated via conduits during operation of the heating phase directly to the heating source, the steps of switching supply of liquid to the user equipment from the heating source to the cooling source and at that time effecting the return of spent liquid from the user equipment to the heating storage zone of the accumulator thereby displacing liquid downwardly in the accumulator and consequently displacing an equal volume of liquid from the cooling storage zone of the accumulator to the cooling source, and subsequently switching the routing in the return conduits so as to return the spent liquid from the user equipment directly to the cooling source while continuing to supply the user equipment from said cooling source.

3. In the process of supplying user equipment with heating and cooling liquids derived respectively from heating and cooling sources associated with respective superposed heating and cooling storage zones in an accumulator with the heating storage zone uppermost via interconnecting piping with the user equipment in a heating phase and in a cooling phase and in which spent liquid from the user equipment ordinarily is circulated via return conduits during operation of the cooling phase directly to the cooling source, the steps of switching supply of liquid to the user equipment from the cooling source to the heating source and at that time effecting the return of spent liquid from the user equipment to the cooling storage zone of the accumulator thereby displacing liquid upwardly in the accumulator and consequently displacing an equal volume of liquid from the heating storage zone of the accumulator to the heating source, and subsequently switching the routing in the return conduits so as to return the spent liquid from the user equipment directly to the heating source while continuing to supply the user equipment from said heating source.

4. In the process of supplying user equipment with heating and cooling liquids derived respectively from heating and cooling sources connected to respective superposed heating and cooling storage zones in an accumulator with the heating storage zone uppermost via interconnecting piping with the user equipment in different first and succeeeding phases and in which spent liquid from the user equipment ordinarily is circulated via return conduits during operation of a first phase directly to the source of said phase, the steps of switching supply of liquid to the user equipment from the source of the first phase to the source of the succeeding phase and at that time effecting the return of spent liquid from the user equipment to the storage zone in the accumulator connected with the first phase thereby displacing liquid within the accumulator downwardly when the change in phase is from heating to cooling and upwardly when the change in phase is from cooling to heating and consequently displacing an equal volume of liquid from the storage zone in the accumulator connected with the succeeding phase to the source of said succeeding phase, and subsequently switching the routing in the return conduits so as to return the spent liquid from the user equipment directly to the source of the succeeding phase while continuing to supply the user equipment from said source of said succeeding phase.

5. In the process of supplying user equipment with heating and cooling liquids derived respectively from heating and cooling sources incorporated with respective superposed heating and cooling storage zones in an accumulator with the heating storage zone uppermost via interconnecting piping with the user equipment in a first phase and a succeeding phase and in which spent liquid from the user equipment ordinarily is circulated via return conduits during operation of the first phase directly to the source thereof, the steps of switching supply of liquid from the source of the first phase to the source of the succeeding phase and at that time effecting the return of spent liquid from the user equipment to the storage zone in the accumulator connected with the first phase thereby displacing liquid within the accumulator downwardly when the change in phase is from heating to cooling and upwardly when the change in phase is from cooling to heating and consequently displacing an equal volume of liquid from the storage zone in the accumulator connected with the succeeding phase to the source of said succeeding phase, and subsequently switching the routing in the return conduits so as to return the spent liquid from the user equipment directly to the source of the succeeding phase while continuing to supply the user equipment from said source of said succeeding phase.

6. In the process of supplying user equipment with heating and cooling liquids derived respectively from heating and cooling sources connected to respective superposed heating and cooling storage zones in an accumulator with the heating storage zone uppermost via interconnecting piping with the user equipment in a heating phase and in a cooling phase and in which spent liquid from the user equipment ordinarily is circulated via return conduits during operation of the heating phase directly to the heating source, the steps of switching supply of liquid to the user equipment from the heating source to the cooling source and at that time effecting the return of spent liquid from the user equipment to the heating storage zone of the accumulator thereby displacing liquid downwardly in the accumulator and consequently displacing an equal volume of liquid from the cooling storage zone of the accumulator to the cooling source, and subsequently switching the routing in the return conduits so as to return the spent liquid from the user equipment directly to the cooling source while continuing to supply the user equipment from said cooling source.

7. In the process of supplying user equipment with heating and cooling liquids derived respectively from heating and cooling sources connected to respective superposed heating and cooling storage zones in an accumulator with the heating storage zone uppermost via interconnecting piping with the user equipment in a heating phase and in a cooling phase and in which spent liquid from the user equipment ordinarily is circulated via return conduits during operation of the cooling phase directly to the cooling source, the steps of switching supply of liquid to the user equipment from the cooling source to the heating source and at that time effecting the return of spent liquid from the user equipment to the cooling storage zone of the accumulator thereby displacing liquid upwardly in the accumulator and consequently displacing an equal volume of liquid from the heating storage zone of the accumulator to the heating source, and subsequently switching the routing in the return conduits so as to return the spent liquid from the user equipment directly to the heating source while continuing to supply the user equipment from said heating source.

8. In the process of supplying user equipment with heating and cooling liquids derived respectively from heating and cooling sources incorporated with respective superposed heating and cooling storage zones in an accumulator with the heating storage zone uppermost via interconnecting piping with the user equipment in a heating phase and in a cooling phase and in which spent liquid from the user equipment ordinarily is circulated via return conduits during operation of the heating phase directly to the heating source, the steps of switching supply of liquid to the user equipment from the heating source to the cooling source and at that time effecting the return of spent liquid from the user equipment to the heating storage zone of the accumulator thereby displacing liquid downwardly in the accumulator and consequently displacing an equal volume of liquid from the cooling storage zone of the accumulator to the cooling source, and subsequently switching the routing in the return conduits so as to return the spent liquid from the user equipment directly to the cooling source while continuing to supply the user equipment from said cooling source.

9. In the process of supplying user equipment with heating and cooling liquids derived respectively from heating and cooling sources incorporated with respective superposed heating and cooling storage zones in an accumulator with the heating storage zone uppermost via interconnecting piping with the user equipment in a heating phase and in a cooling phase and in which spent liquid from the user equipment ordinarily is circulated via return conduits during operation of the cooling phase directly to the cooling source, the steps of switching supply of liquid to the user equipment from the cooling source to the heating source and at that time effecting the return of spent liquid from the user equipment to the cooling storage zone of the accumulator thereby displacing liquid upwardly in the accumulator and consequently displacing an equal volume of liquid from the heating storage zone of the accumulator to the heating source, and subsequently switching the routing in the return conduits so as to return the spent liquid from the user equipment directly to the heating source while continuing to supply the user equipment from said heating source.

10. Apparatus for supplying user equipment with heating and cooling liquids in successive heating and cooling phases comprising an accumulator having superposed heating and cooling storage zones, a heating source connected with the heating storage zone, a cooling source connected with the cooling storage zone, interconnecting piping between said sources, zones and the user equipment, return conduits from the user equipment respectively to the sources and to the zones, means to supply liquid in a heating phase to the user equipment from the heating source via said piping, means in the return conduits ordinarily during operation of the heating phase to circulate spent liquid from the user equipment directly to the heating source, means for switching the supply of liquid to the user equipment for a cooling phase from said heating source to said cooling source and at that time effecting the return of spent liquid from the user equipment to the heating storage zone of the accumulator thereby displacing an equal volume of liquid from said cooling storage zone to said cooling source, and means for subsequently switching the routing of the return conduits so as to return the spent liquid from the user equipment directly to the cooling source while continuing to supply the user equipment with liquid from said cooling source.

11. Apparatus for supplying user equipment with heating and cooling liquids in successive heating and cooling phases comprising an accumulator having superposed heating and cooling storage zones, a heating source connected with the heating storage zone, a cooling source connected with the cooling storage zone, interconnecting piping between said sources, zones and the user equipment, return conduits from the user equipment respectively to the sources and to the zones, means to supply liquid in a cooling phase to the user equipment from the cooling source via said piping, means in the return conduits ordinarily during operation of the cooling phase to circulate spent liquid from the user equipment directly to the cooling source, means for switching the supply of liquid to the user equipment for a heating phase from said cooling source to said heating source and at that time effecting the return of spent liquid from the user equipment to the cooling storage zone of the accumulator thereby displacing an equal volume of liquid from said heating storage zone to said heating source, and means for subsequently switching the routing of the return conduits so as to return the spent liquid from the user equipment directly to the heating source while continuing to supply the user equipment with liquid from said heating source.

12. Apparatus for supplying user equipment with heating and cooling liquids in successive first and second phase operations comprising an accumulator having superposed heating and cooling storage zones, a heating source associated with the heating storage zone, a cooling source associated with the cooling storage zone, interconnecting piping between said sources, zones and the user equipment, return conduits from the user equipment to the sources and to the zones, means to supply liquid in a first phase operation to the user equipment from a first of said sources via said piping, means in the return conduits ordinarily during said first phase operation to circulate spent liquid from the user equipment directly to said first of said sources, means for switching the supply of liquid to the user equipment for a second phase operation from said first of said sources to the second of said sources and at that time effecting the return of spent liquid from the user equipment to the storage zone associated with the first of said sources, and means for subsequently switching the routing of the return conduits so as to return the spent liquid from the user equipment directly to the second of said sources while continuing to supply the user equipment with liquid from said second of said sources.

13. Apparatus according to claim 12 wherein said last-named means includes valve means in the return conduits and thermally responsive means for operating said valve means.

14. Apparatus as per claim 12 wherein said last-named means include valve means in the return conduits and timing-means for operating said valve means.

15. Apparatus for supplying user equipment with heating and cooling liquids in successive heating and cooling phases comprising an accumulator having superposed heating and cooling storage zones, a heating source incorporated with the heating storage zone, a cooling source incorporated with the cooling storage zone, interconnecting piping between said storage zones, sources, and the user equipment, return conduits from the user equipment to the sources and the storage zones, means to supply liquid in a cooling phase to the user equipment from the cooling source via said piping, means in the return conduits ordinarily during operation of the cooling phase to circulate spent liquid from the user equipment directly to the cooling source, means for switching the supply of liquid to the user equipment for a heating phase from said cooling source to said heating source and at that time effecting the return of spent liquid from the user equipment to the cooling storage zone of the accumulator thereby displacing an equal volume of liquid from said heating storage zone to said heating source, and means for subsequently switching the routing of the return conduits so as to return the spent liquid from the user equipment directly to the heating source while continuing to supply the user equipment with liquid from said heating source.

16. Apparatus for supplying user equipment with heating and cooling liquids in successive heating and cooling phases comprising an accumulator having superposed heating and cooling storage zones, a heating source incorporated with the heating storage zone, a cooling source incorporated with the cooling storage zone, interconnecting piping between said zones, sources, and the user equipment, return conduits from the user equipment to the sources and the storage zones, means to supply liquid in a heating phase to the user equipment from the heating source via said piping, means in the return conduits ordinarily during operation of the heating phase to circulate spent liquid from the user equipment directly to the heating source, means for switching the supply of liquid to the user equipment for a cooling phase from said heating source to said cooling source and at that time effecting the return of spent liquid from the user equipment to the heating storage zone of the accumulator thereby displacing an equal volume of liquid from said cooling storage zone to said cooling source, and means for subsequently switching the routing of the return conduits so as to return the spent liquid from the user equipment directly to the cooling source while continuing to supply the user equipment with liquid from said cooling source zone.

17. Apparatus for supplying user equipment with heating and cooling liquids in successive first and second phase operations comprising an accumulator having superposed heating and cooling storage zones, a heating source connected to the heating storage zone, a cooling source connected to the cooling storage zone, interconnecting piping between said zones, sources and the user equipment, return conduits from the user equipment to the sources and the zones, means to supply liquid in a first phase operation to the user equipment from a first of said sources via said piping, means in the return conduits ordinarily during said first phase operation to circulate spent liquid from the user equipment directly to said first of said sources, means for switching the supply of liquid to the user equipment for a second phase operation from said first of said sources to the second of said sources and at that time effecting the return of spent liquid from the user equipment to the storage zone connected to the first of said sources and means for subsequently switching the routing of the return conduits so as to return the spent liquid from the user equipment directly to the second of said sources while continuing to supply the user equipment with liquid from said second of said sources.

18. Apparatus as per claim 17 wherein said last-named means includes valve means in the return conduits and thermally responsive means for operating said valve means.

19. Apparatus as per claim 17 wherein said last-named means includes valve means in the return conduits and timing means for operating said valve means.

20. Apparatus for supplying user equipment with heating and cooling liquids in successive first and second phase operations comprising an accumulator having superposed heating and cooling storage zones, a heating source connected to said heating storage zone, a cooling source connected to said cooling storage zone, interconnecting piping between the sources, zones and the user equipment, return conduits from the user equipment to the sources and the zones, pumping means to supply liquid in a first phase operation to the user equipment from either of said sources via said piping, means in the return conduits ordinarily during said first phase operation to circulate spent liquid from the user equipment directly to the first of said sources via said piping, means for switching operation of the pumping means to switch the supply of liquid to the user equipment for a second phase operation from said first of said sources to the second of said sources and at that time effecting the return of spend liquid from the user equipment to the storage zone connected to the first of said sources, and valve means for subsequently switching the routing of the return conduits so as to return the spent liquid from the user equipment directly to the second of said sources while continuing operation of said pumping means to supply the user equipment with liquid from said second of said sources.

References Cited in the file of this patent

UNITED STATES PATENTS

| | | |
|---|---|---|
| 1,963,786 | Glenn | June 19, 1934 |
| 2,073,677 | Broderick | Mar. 16, 1937 |
| 2,739,792 | Blum | Mar. 27, 1956 |